(12) United States Patent
Wang et al.

(10) Patent No.: US 11,824,780 B2
(45) Date of Patent: Nov. 21, 2023

(54) MANAGING TUNNEL INTERFACE SELECTION BETWEEN GATEWAYS IN A COMPUTING ENVIRONMENT (71) Applicant: VMWARE, INC., Palo Alto, CA (US)

(72) Inventors: Yong Wang, Palo Alto, CA (US); Awan Kumar Sharma, Pune (IN); Xinhua Hong, Palo Alto, CA (US); Abhishek Goliya, Pune (IN)

(73) Assignee: VMware, Inc., Palo Alto, CA (US)

(*) Notice: Subject to any disclaimer, the term of this patent is extended or adjusted under 35 U.S.C. 154(b) by 85 days.

(21) Appl. No.: 17/502,081

(22) Filed: Oct. 15, 2021

(65) Prior Publication Data
US 2023/0024885 A1 Jan. 26, 2023

(30) Foreign Application Priority Data

Jul. 22, 2021 (IN) .............................. 202141032908

(51) Int. Cl.
H04L 12/747 (2013.01)
H04L 12/66 (2006.01)
H04L 12/46 (2006.01)
H04L 45/74 (2022.01)

(52) U.S. Cl.
CPC ........ H04L 45/742 (2013.01); H04L 12/4633 (2013.01); H04L 12/66 (2013.01); H04L 2212/00 (2013.01)

(58) Field of Classification Search
CPC ... H04L 45/742; H04L 12/4633; H04L 12/66; H04L 2212/00; H04L 12/4625
See application file for complete search history.

(56) References Cited

U.S. PATENT DOCUMENTS

| 7,116,681 B1* | 10/2006 | Hovell ................ H04L 61/251 370/402 |
| 9,577,845 B2 | 2/2017 | Thakkar et al. |
| 10,079,779 B2 | 9/2018 | Zhang et al. |
| 10,225,137 B2 | 3/2019 | Jain et al. |
| 10,700,960 B2 | 6/2020 | Bangalore Krishnamurthy |
| 10,938,594 B1 | 3/2021 | Jain et al. |
| 2012/0215933 A1* | 8/2012 | Liu ..................... H04L 12/4633 709/230 |
| 2016/0036773 A1* | 2/2016 | Luo ..................... H04L 12/4633 370/392 |
| 2016/0094632 A1* | 3/2016 | Jain ........................ H04L 69/16 709/204 |

(Continued)

OTHER PUBLICATIONS

U.S. Appl. No. 17/507,832, filed Oct. 15, 2021, 29 pages.
U.S. Appl. No. 17/507,822, filed Oct. 22, 2021, 24 pages.

Primary Examiner — Luat Phung (57) ABSTRACT

Described herein are systems, methods, and software to manage the selection of an edge gateway or edge for processing a packet. In one implementation, a first edge may receive a packet and hash addressing information in the packet to select a second edge to process the packet. The first edge may further forward the packet to the second edge, permitting the second edge to process the packet. Once processed, the second edge may forward the packet to a destination host computing system and notify the host computing system to use the second edge for response packets directed at a source internet protocol (IP) address in the packet.

20 Claims, 6 Drawing Sheets (56) References Cited

U.S. PATENT DOCUMENTS

| | | |
|---|---|---|
| 2016/0094661 A1* | 3/2016 | Jain .................... H04L 63/0245 |
| | | 709/227 |
| 2016/0142295 A1 | 5/2016 | Parsa et al. |
| 2018/0176074 A1 | 6/2018 | Bangalore Krishamurthy |
| 2018/0205673 A1 | 7/2018 | Jain et al. |
| 2019/0036815 A1 | 1/2019 | Kancherla et al. |
| 2021/0067378 A1 | 3/2021 | Coimbatore Natarajan et al. |
| 2021/0218600 A1 | 7/2021 | Wang et al. |
| 2021/0218623 A1 | 7/2021 | Jain et al. |
| 2022/0029913 A1 | 1/2022 | Lin et al. |

\* cited by examiner

MANAGING TUNNEL INTERFACE SELECTION BETWEEN GATEWAYS IN A COMPUTING ENVIRONMENT

RELATED APPLICATION

Benefit is claimed under 35 U.S.C. 119(a)-(d) to Foreign Application Serial No. 202141032908 filed in India entitled "MANAGING TUNNEL INTERFACE SELECTION BETWEEN GATEWAYS IN A COMPUTING ENVIRONMENT", on Jul. 22, 2021, by VMware, Inc., which is herein incorporated in its entirety by reference for all purposes.

BACKGROUND

In computing environments, edge gateways (or, simply, "edges") are used to provide network connectivity for host computing systems. These host computing systems may execute virtual machines, containers, or some other virtualized interface. The edge gateways may be used to provide various operations on the ingress and egress packets to the various hosts, including firewall operations, filtering, encryption/decryption, or some other operation with respect to the packets. For example, a packet may be received at an edge from an external network, processed by the edge, and forwarded to a destination host.

However, while edges may provide networking operations to connect hosts and the virtual computing elements to an external network, difficulties can arise as the number of edges is increased in a computing environment. In some implementations, each of the edges may provide operations on a different set of internet protocol (IP) addresses, requiring packets to be exchanged between the edges for processing. This may cause inefficiencies in communicating data between the hosts and the external networks.

SUMMARY

The technology described herein manages the hashing and exchanging of packets between edge gateways in a computing environment. In one implementation, a method of operating a first gateway includes receiving, from a second gateway, an encapsulated first packet at a first tunnel interface of a plurality of tunnel interfaces, decapsulating the encapsulated first packet to obtain the first packet and identifying addressing information in the first packet. The method further includes storing an entry in a cache that associates the addressing information from the first packet with an identifier for the first tunnel interface and communicating the first packet to a computing system. The method also provides for receiving, from the computing system, a second packet and determining that addressing information in the second packet matches the addressing information from the first packet. In response to determining that the addressing information in the second packet matches the addressing information from the first packet, the method further includes encapsulating the second packet and communicating the encapsulated second packet to the second gateway using the first tunnelinterface.

DETAILED DESCRIPTION

Figure 1:
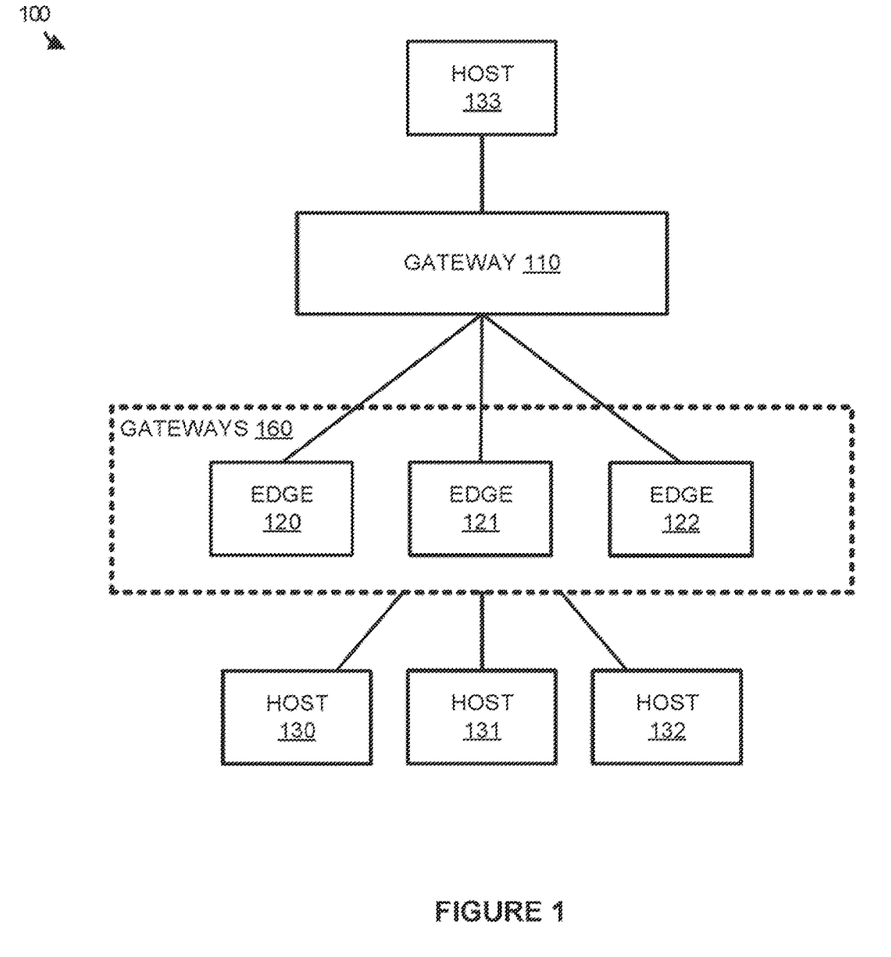
FIG. 1 illustrates a computing environment to manage tunnel interface selection between gateways in a computing environment according to an implementation.

FIG. 1 illustrates a computing environment 100 to manage tunnel interface selection between gateways in a computing environment according to an implementation. Computing environment 100 includes gateway 110 representative of gateway capable of providing equal-cost multi-path routing (ECMP), random selection, or some other distribution of communications to gateways 160. Gateway 110 can provide routing operations, firewall operations, encapsulation operations, and other similar operations and is communicatively coupled to host 133. Gateways 160 includes edge gateways (or "edges") 120-122 that can provide various networking operations for ingress and egress packets for hosts 130-132. Gateway 110 and host 133 may be at a first data center or computing site, while edges 120-122 and hosts 130-132 may be located at a second data center or computing site.

In computing environment 100, hosts 130-133 are deployed to provide a platform for virtual computing elements, such as virtual machines, containers, or some other virtualized endpoint. To provide connectivity for the virtual computing elements, logical and physical networking (not separately shown) may be used to provide firewalls, switching, routing, encapsulation, and other operations with respect to the ingress and egress packets for the virtual machines. Here, to provide high availability, each of the hosts 130-132 is connected to edges 120-122, permitting packets to be sent to or received from the host using any of the available edges. Similarly, gateway 110, is communicatively coupled to host 133 and edges 120-122, permitting packets to be routed to the hosts 130-132 using multiple routes and tunnels.

In one implementation, when a packet is received at one of edges 120-122 from one of hosts 130-132, the packet may be encapsulated and forwarded to gateway 110, wherein the encapsulation may comprise an IPsec encapsulation. For example, gateway 110 may include three tunnel interfaces or virtual tunnel interfaces (VTIs) that each correspond to a different edge of edges 120-122. When an encapsulated packet is received at gateway 110, gateway 110 may decapsulate the packet and forward the packet toward host 133. Although demonstrated as coupled to a single host, gateway 110 may be coupled to multiple hosts in some examples.

In addition to forwarding the decapsulated packet to host 133, gateway 110 may further store an entry in a cache that associates addressing information from the decapsulated packet with an identifier for the tunnel interface that the encapsulated packet was received. This information may include source and destination IP addressing information from the packet, source and destination port information from the packet, protocol information from the packet, or some other information. The addressing information corresponds to the inner packet after decapsulating the packet. When a return packet is received from host 133, gateway 110 may compare the addressing in the return packet to the entries in the cache to determine whether a match exists. In some implementations, the return packet may also be encapsulated by host 133, wherein gateway 110 may decapsulate the packet to identify addressing information for the packet. If a match exists with an entry in the cache (e.g., source and destination IP addresses match), gateway 110 may forward the packet to the edge of edges 120-122 using the corresponding tunnel interface identified in the cache. If a match does not exist, gateway 110 may perform ECMP to select an edge from edges 120-122 for sending the packet. This selection of an edge may include hashing the addressing information from the packet to select the edge, randomly selecting an edge, performing round-robin to select an edge, or performing some other operation to select an edge.

Figure 2A:
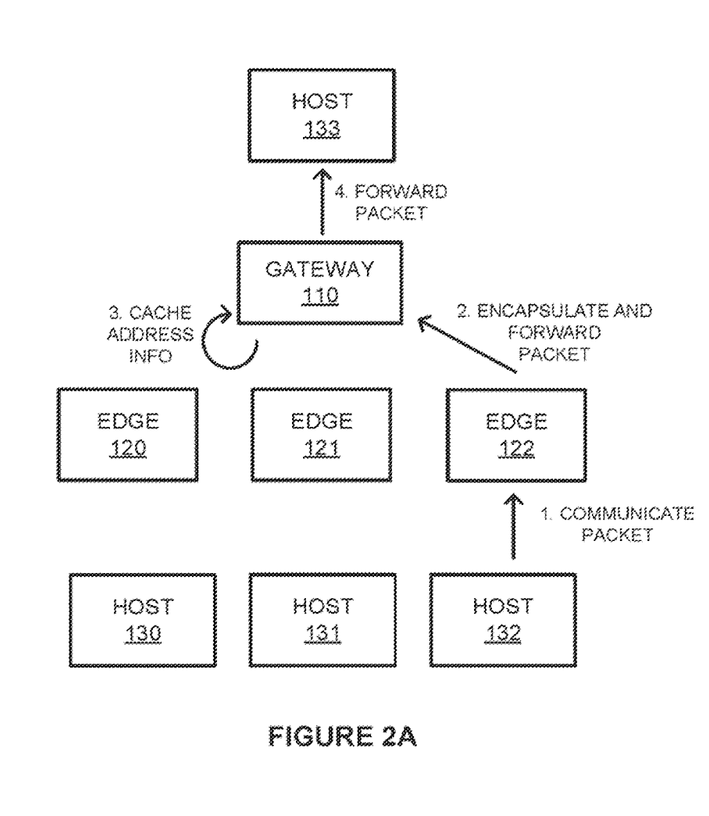
FIGS. 2A-2B illustrate an operational scenario of managing tunnel interface selection in a computing environment according to an implementation.
Figure 2B:
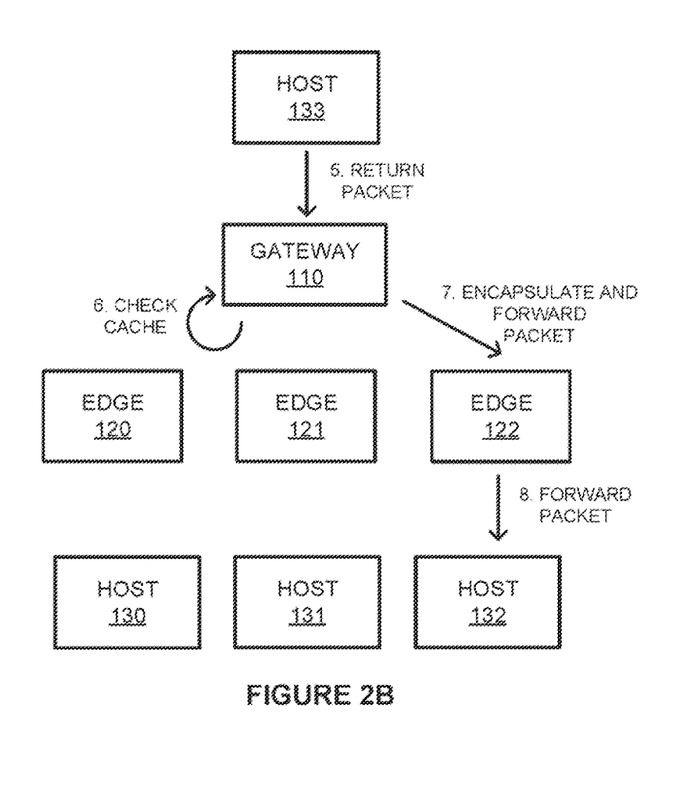

FIGS. 2A-2B illustrate an operational scenario of managing tunnel interface selection in a computing environment according to an implementation. FIG. 2 includes hosts 130-133, edges 120-122, and gateway 110 of FIG. 1. Although demonstrated as initiating a communication from host 132, similar operations may be performed when a communication is initiated from hosts 130-131.

Referring first to FIG. 2A, host 132 communicates, at step 1, a packet to edge 122. The packet in some examples may be encapsulated using Generic Network Virtualization Encapsulation (GENEVE), Virtual Extensible LAN (VXLAN), or some other encapsulation format. Edge 122 may be selected using ECMP, random selection, or some other mechanism. For example, host 132 may process addressing information in the packet or hash the addressing information in the packet to select an edge from edges 120-122 based on the result of the processing or hashing. Once the packet is received by edge 122, edge 122 may process the packet, encapsulate the packet, and forward the packet to gateway 110 at step 2. The processing of the packet may include applying one or more firewall rules, determining a next-hop for the packet, or providing some other operation in association with the packet. The encapsulation may include IPsec encapsulation that is used to tunnel packets between edge 122 and a tunnel interface at gateway 110.

After the encapsulated packet is received at gateway 110, gateway 110 may decapsulate the packet and cache addressing information from the decapsulated packet, at step 3. The addressing information may include at least source and destination IP addresses, and may further include source and destination ports, and a protocol for the packet. The packet is further forwarded, at step 4, to a host 133 behind gateway 110, wherein the host may provide a platform for one or more virtual machines in some examples. In some implementations, gateway 110 may encapsulate the packet for a second time using GENEVE, VXLAN, or some other encapsulation format and provide the encapsulated packet to host 133 for processing.

Turning to FIG. 2B, host 133 may provide a return packet, at step 5, to gateway 110, wherein the return packet responds to the original communication from host 132. In response to receiving the packet, gateway 110, checks the maintained cache to determine whether an entry is present for the addressing in the return packet at step 6. In some implementations, the return packet provided by host 133 may be encapsulated, causing gateway 110 to decapsulate the packet and identify the required addressing information in the decapsulated packet. Once the addressing information is identified, the addressing information may be compared to entries in the table to determine if a match exists (e.g., compares source and destination IP addresses to entries in the table). Here, because a match exists, the return packet is encapsulated, at step 7, and forwarded to edge 122 based on the tunnel interface associated with the addressing information. Edge 122 decapsulates the packet and forwards the packet to host 132 based on routing information maintained at edge 122. Here, because gateway 110 maintains a cache of the addressing information for received packets from edges 120-122, gateway 110 may direct return packets to the same edge to prevent the edges from having to exchange packets for proper processing of the packets. Specifically, the cache may prevent a return packet from being communicated to edge 120, which in turn would forward the packet to edge 122 for processing.

In some implementations, the cache may remove one or more entries based on timeouts for when the packets were received, based on changes to the available tunnel interfaces, or based on some other factor. For example, gateway 110 may maintain a timestamp for when the most recent packet was received in association with specific addressing information. After a timeout period following the timestamp where no further traffic was received, gateway 110 may remove the entry from the cache. In another example, gateway 110 may monitor for a connection to be reestablished or some other notification indicating that the cache entry can be removed.

In some implementations, gateway 110 may represent an edge gateway at a first computing site with host 133, while edges 120-222 and hosts 130-132 operate at a second computing site. Although demonstrated with a single gateway 110, host 133 may be serviced by multiple gateways like hosts 130-132.

Figure 3A:
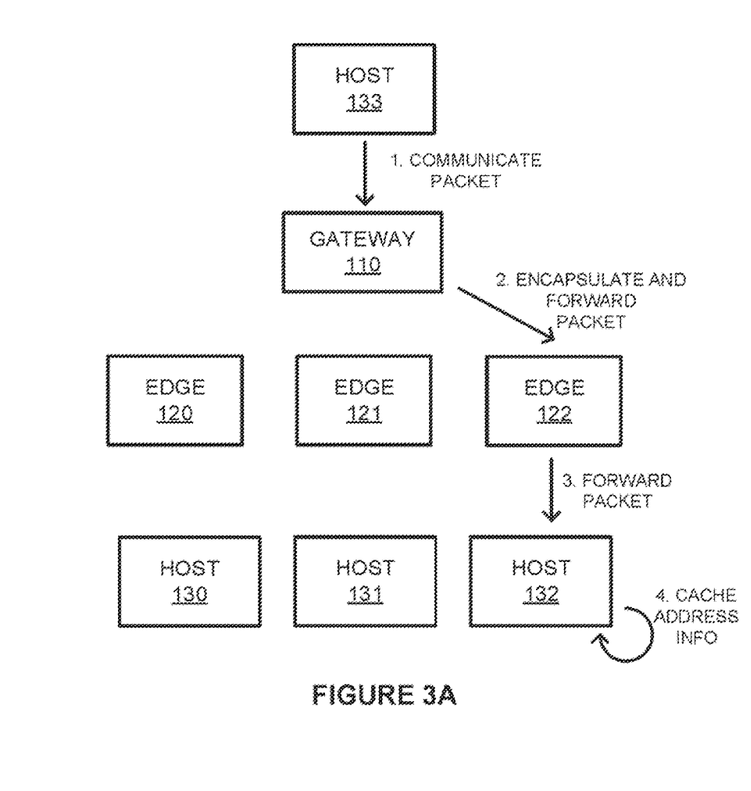
FIGS. 3A-3B illustrate an operational scenario of managing tunnel interface selection in a computing environment according to an implementation.
Figure 3B:
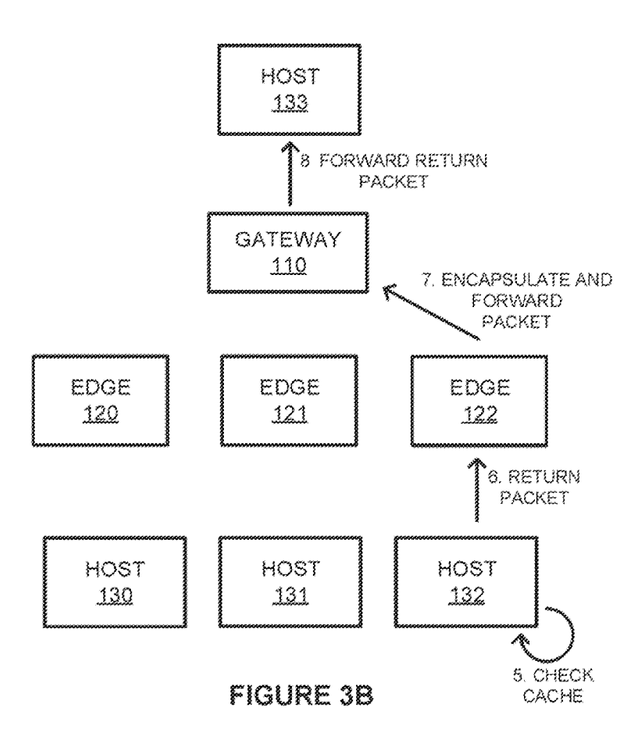

FIGS. 3A-3B illustrate an operational scenario of managing tunnel interface selection in a computing environment according to an implementation. FIG. 3 includes hosts 130-133, edges 120-122, and gateway 110 of FIG. 1. Although demonstrated as delivering a communication to host 132, similar operations may be performed when a communication is communicated to hosts 130-131.

Referring first to FIG. 3A, a packet is communicated from host 133 that is received by gateway 110 at step 1. In response to receiving the packet, gateway 110 may encapsulate the packet and forward the packet to an edge of edges 120-122 at step 2. In some implementations, the packet from host 132 may be encapsulated using GENEVE, VXLAN, or some other format. Once received, gateway 110 may decapsulate the packet and re-encapsulate the packet using IPsec after processing. The processing may include firewall operations, routing determinations, or some other processing of the packet prior to forwarding the packet to edge 122. Once the packet is received by edge 122, the packet is decapsulated and forwarded, at step 3, to a host 132 associated with the destination IP address in the decapsulated packet. In some examples, the packet may be encapsulated again in the communication from edge 122 to host 132, wherein the encapsulation may use GENEVE, VXLAN, or the like.

When the packet is received at host 132, host 132 may decapsulate the packet and forward the packet to a virtual computing element executing thereon. Additionally, host 132 may cache addressing information from the packet in a local cache. The local cache may be used to route return packets to an appropriate edge of edges 120-122. Specifically, each entry in the cache may associate addressing information with an edge 120-122 or a tunnel interface directed at the corresponding edge of edges 120-122. The addressing information may include tuple information include source and destination IP addressing of the packet, source and destination ports from the packet, a protocol of the packet, or some other addressing information. For example, an entry may indicate that packets with a particular source and destination IP address should be routed to a tunnel interface associated with an edge of edges 120-122.

Turning to FIG. 3B, when host 132 requires a communication of a return packet to host 133, host 132 may check at step 5, the cache to determine whether a match exists for the return packet. Here, because the addressing information in the return packet matches the addressing information in a cache entry, the packet is directed at step 6, to edge 122 using a tunnel interface on host 132 associated with the addressing information. The packet may be encapsulated in the communication to edge 122 in some examples. Once received, edge 122 may process the packet, encapsulate the packet, and forward, at step 7, the packet to gateway 110. In some implementations, in processing the packet, edge 122 may decapsulate the packet from host 132, apply firewall rules to the packet, routing rules to the packet, or provide some other operation on the packet. Once processed, the packet is encapsulated and forwarded to gateway 110.

In response to receiving the encapsulated packet, gateway 110 may decapsulate the packet, process the packet, and forward the packet to host 133 at step 8. In forwarding the packet, gateway 110 may encapsulate the packet in some examples. Thus, encapsulation may be used between host 132 and edge 122, between edge 122 and gateway 110, and between gateway 110 and host 133.

Figure 4:
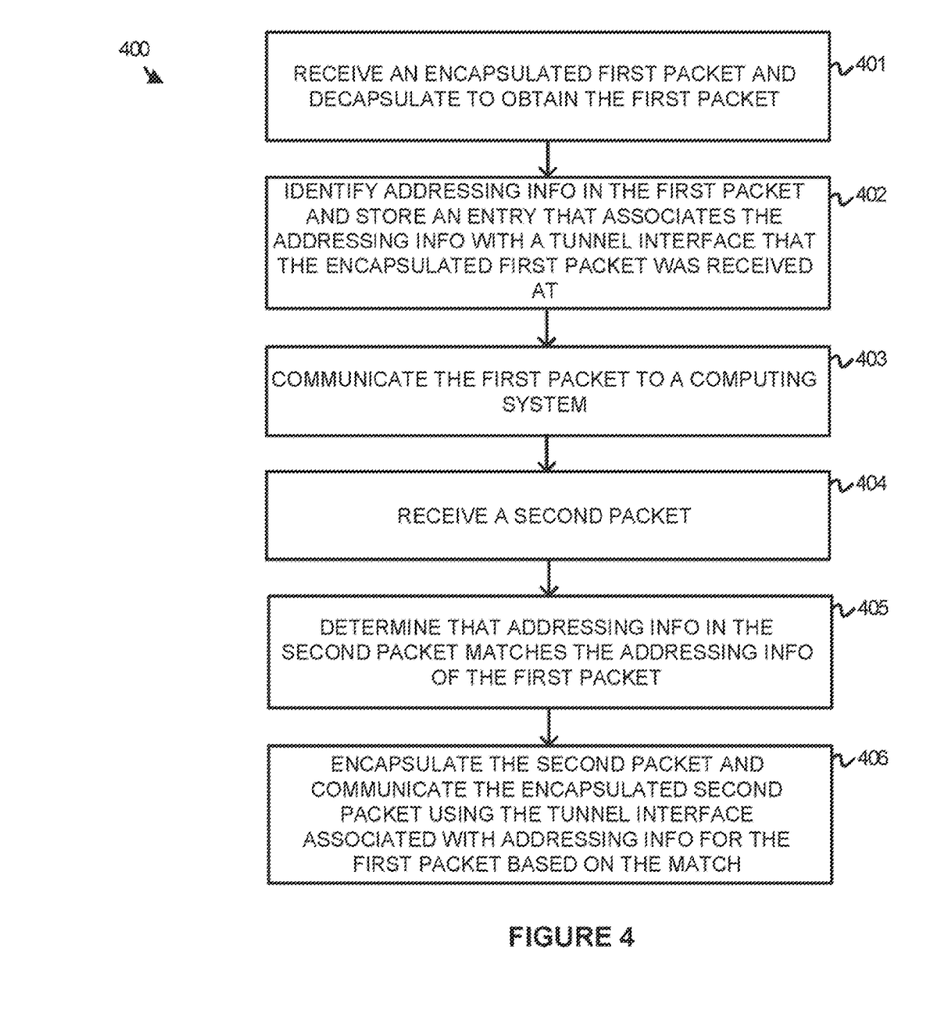
FIG. 4 illustrates a method of operating a gateway to manage tunnel interface selection according to an implementation.

FIG. 4 illustrates a method 400 of operating a gateway to manage tunnel interface selection according to an implementation. The steps of method 400 are referenced parenthetically in the paragraphs that follow with reference to systems and elements of computing environment 100 of FIG. 1.

As depicted, method 400 includes receiving (401), from a second gateway, an encapsulated first packet at a first tunnel interface of a plurality of tunnel interfaces, and decapsulating the encapsulated first packet to obtain the first packet. As an example, host 132 may communicate a packet that is destined for host 133, wherein the packet is forwarded to a local edge gateway, such as edge 122, encapsulated using IPsec, and forwarded toward gateway 110. Once received, gateway 110 may decapsulate the packet to obtain the inner packet.

After decapsulation, method 400 further includes identifying (402) addressing information in the first packet and storing an entry in a cache that associates the addressing information from the first packet with an identifier for the first tunnel interface. The addressing information may include an IP addressing, port information, protocol information, or some other addressing information. The tunnel identifier may include a numerical value, or some other value associated with each tunnel interface from edges 120-122. Specifically, each unique tunnel interface may be allocated a unique value when the tunnels are configured for communication with edges 120-122. In addition to adding an entry to the cache, method 400 also communicates (403) the first packet to a destination host computing system. In some implementations, the first packet may be re-encapsulated using VXLAN, GENEVE, or some other tunneling protocol.

After the first packet is communicated to the host computing system, method 400 also receives (404) a second packet from the host computing system and determines (405) that addressing information in the second packet matches the addressing information of the first packet in the cache. For example, after gateway 110 communicates a first packet to host 133, host 133 may provide a return second packet that matches the IP addressing or other addressing information of the first packet. Once a match is identified, the method encapsulates (406) the second packet and communicates the encapsulated second packet to the second gateway using the first tunnel interface based on the addressing information in the second packet matching the addressing information from the first packet. Accordingly, when a match exists in the cache, gateway 110 may identify the corresponding tunnel interface for the match, encapsulate the packet, and forward the packet using the corresponding tunnel interface. Advantageously, when a first packet is received from edge 122 at a first tunnel interface of the three available tunnel interfaces, any return packet that shares addressing information from the first packet may be routed to the edge 122.

Although demonstrated in the previous example when a match occurs, gateway 110 may also identify when a match does not exist for the packet. In these examples, gateway 110 may perform ECMP or some other selection mechanism to select an edge of edges 120-122 to process the packet. Once selected, the packet can be encapsulated and forwarded to the selected edge. In some implementations, entries within the cache can be removed, wherein the removal may occur after a timeout period from the most recent packet, an administrator request to clear the cache, an express reset, or some other reason. In some examples, when a packet is received at gateway 110 from an edge of edges 120-122, gateway 110 may determine that an entry exists in the cache and will not update or add an additional entry to the cache.

Figure 5:
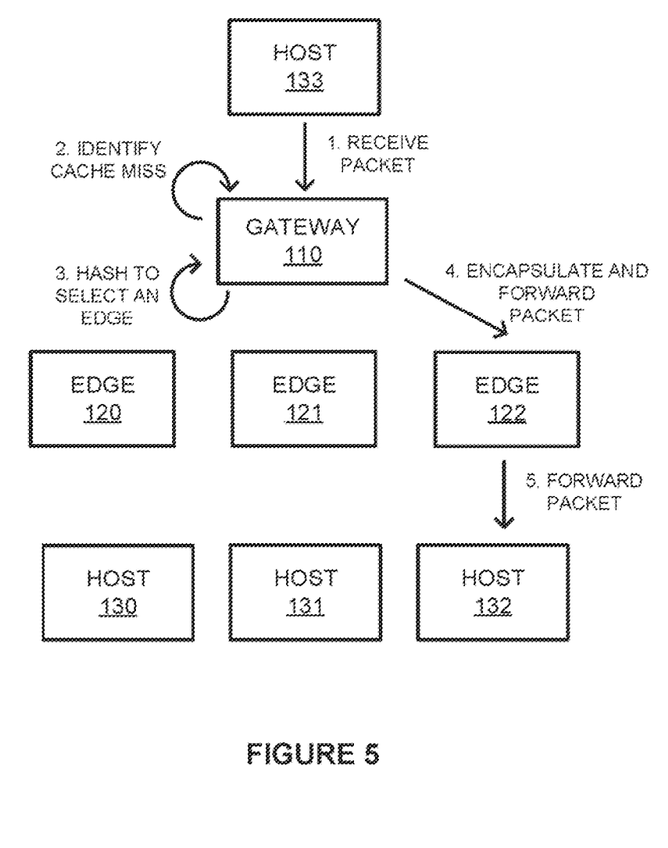
FIG. 5 illustrates an operational scenario of managing tunnel interface selection according to an implementation.

FIG. 5 illustrates an operational scenario 500 of managing tunnel interface selection according to an implementation. Operational scenario 500 includes hosts 130-132, edges 120-122, and gateway 110 from FIG. 1.

As depicted, host 133 communicates a packet that is received, at step 1, by gateway 110. In response to receiving the packet, gateway 110 may determine that the packet is directed toward hosts 130-132 supported by edges 120-122. Gateway 110 may further determine whether an entry exists in a cache that indicates a tunnel interface or edge of edges 120-122 for the packet to be directed. For example, host 133 may communicate an encapsulated first packet using GENEVE to gateway 110. Gateway 110 may decapsulate the packet and determine whether the addressing in the packet after decapsulation matches an entry in the cache. Specifically, when a packet is received from an edge of edges 120-122, gateway 110 may cache addressing information, such as the source and destination IP address, for comparison with return packets to permit the return packets to be routed directly to the original sending edge. Here, gateway 110, identifies a cache miss, at step 2, indicating that an entry is not present in the cache to direct the packet to one of edges 120-122. In response to determining that the packet does not correspond to an entry in the cache, gateway 110 hashes, at step 3, information in the header of the packet to select an edge from edges 120-122. The hashing may include hashing source and destination IP addressing of the packet, hashing source and destination ports, hashing the protocol, or some other operation. For example, a hash may be used on the source and destination IP addressing to obtain a value that corresponds to an edge of 120-122.

In the present implementation, gateway 110 determines that edge 122 should receive the egress packet. To support the communication gateway 110 encapsulates, at step 4, and forwards the packet at step 4 to edge 122. In forwarding the packet, gateway 110 may use a tunnel interface that corresponds to edge 122. Specifically, each edge 122 may establish an IPsec tunnel with a different tunnel interface at gateway 110. A tunnel interface may include unique addressing attributes in relation to other tunnel interfaces at the same gateway. The tunnel interface may establish a tunnel with a corresponding edge of edges 120-122.

Once the packet is delivered to edge 122 in this example, edge 122 forwards the packet, at step 5, to host 132. In some implementations, the IPsec or other tunneled packet from gateway 110 may be decapsulated at edge 122. Once decapsulated, the packet may be processed by edge 122 to provide firewall, routing, or any other operation associated with the packet. Additionally, edge 122 may re-encapsulate the packet and forward the packet toward host 132.

Figure 6:
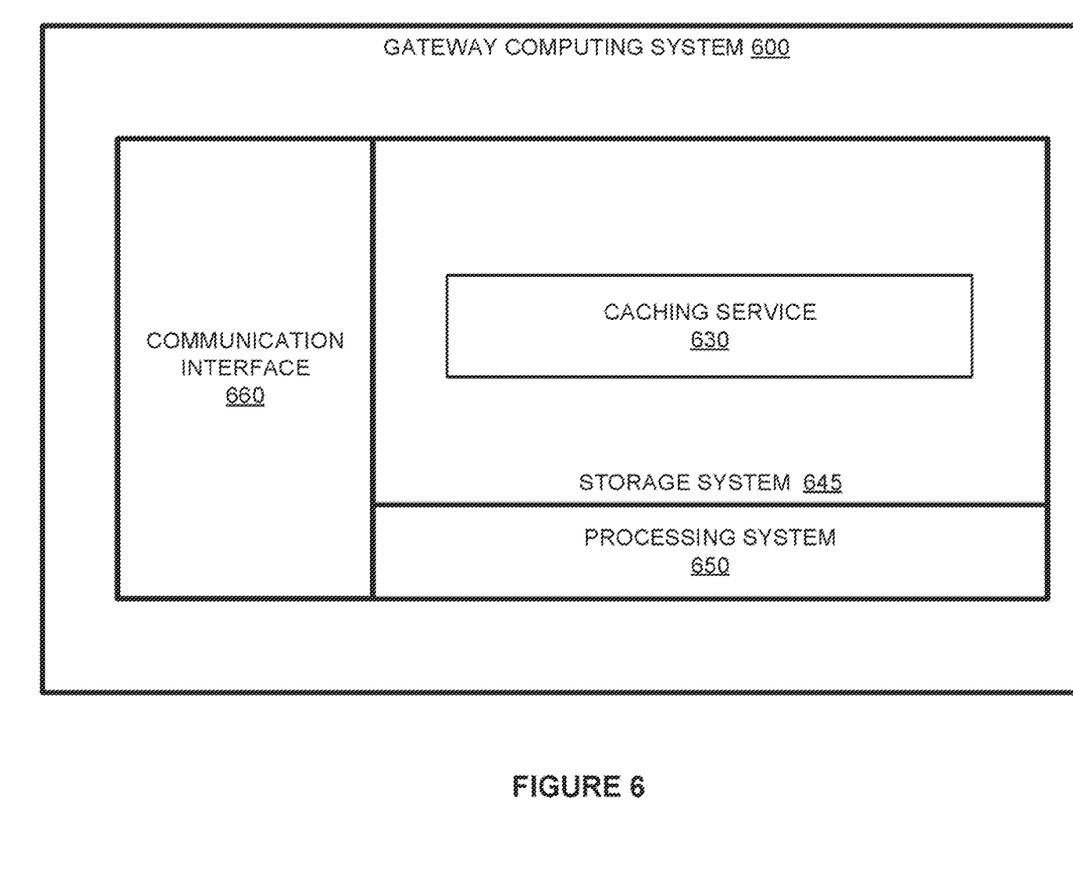
FIG. 6 illustrates a gateway computing system according to an implementation.

FIG. 6 illustrates a gateway computing system 600 according to an implementation. Computing system 600 is representative of any computing system or systems with which the various operational architectures, processes, scenarios, and sequences disclosed herein for an edge gateway can be implemented. Computing system 600 is an example of gateway 110 of FIG. 1, although other examples may exist. Computing system 600 includes storage system 645, processing system 650, and communication interface 660. Processing system 650 is operatively linked to communication interface 660 and storage system 645. Communication interface 660 may be communicatively linked to storage system 645 in some implementations. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 is configured to communicate with host computing systems and gateways.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage system 645 comprises computer programs, firmware, or some other form of machine-readable program instructions. The operating software of storage system 645 comprises caching service 630 that provides at least method 400 of FIG. 4. The operating software on storage system 645 may further include an operating system, utilities, drivers, network interfaces, applications, or some other type of software. When read and executed by processing system 650 the operating software on storage system 645 directs computing system 600 to operate as described herein.

In at least one implementation, caching service 630 directs processing system 650 to receive, from a second gateway, an encapsulated first packet in at a first tunnel interface of a plurality of tunnel interfaces and decapsulate the encapsulated first packet to obtain the first packet. Once decapsulated, caching service 630 directs processing system 650 to store an entry in a cache that associates addressing information from the first packet with an identifier for the first tunnel interface. In some implementations, multiple tunnel interfaces of gateway computing system 600 are each coupled to a different edge that can provide ECMP routing to computing systems behind the edges. For example, computing system 600 may represent a gateway at a first computing site, while edges communicatively coupled to computing system 600 represent gateways at a second computing site. Each of the gateways may be used to communicate with one or more hosts that execute behind the gateways and provide a platform for one or more virtual nodes, such as virtual machines and containers. When a packet is communicated from a host at the second computing site to the first computing site, the packet may be forwarded from the host to an edge, the edge may encapsulate the packet, and the edge may forward the encapsulated packet to computing system 600.

Once the packet is received at computing system 600 and decapsulated, addressing information is identified in the packet and added to a cache if an entry does not already exist for the addressing information. The addressing information may include IP addresses, ports, or some other addressing information for the packet. An entry may associate the addressing information with a tunnel interface identifier that the encapsulated packet was received. For example, computing system 600 may include four tunnel interfaces that are each coupled to a different edge. Each of the tunnel interfaces may be associated with a unique identifier or value, which is identified when an encapsulated packet is received at the tunnel interface. Once decapsulated, the addressing information is identified to determine whether an entry exists in the cache. When an entry exists, a new entry is not added to the cache. However, if an entry does not exist, an entry may be added to the cache that associates the addressing information from the packet to an identifier for the tunnel interface that the encapsulated packet was received.

In addition to adding the entry to the cache, caching service 630 further directs processing system 650 to communicate the first packet to a computing system, such as a host computing system operating behind computing system 600. In forwarding the first packet, caching service 630 may encapsulate the packet using GENEVE, VXLAN, or some other encapsulation and forward the packet to a destination host. Once the first packet is forwarded, caching service 630 further directs processing system 650 to receive a return packet from the computing system and identify addressing information in the return packet. In some examples, the return packet may be encapsulated from a host, and computing system 600 may decapsulate the return packet to identify the addressing in the return packet.

The addressing in the return packet is then compared to entries in the cache to determine if there is a match. For example, source and destination addressing in the return packet may be compared to source and destination addressing information in the cache to determine whether the packet is a return packet. When a match exists in the cache, caching service 630 directs processing system 650 to encapsulate the return packet and communicate the encapsulated return packet to the second gateway using the first tunnel interface based on the match. Specifically, caching service 630 may identify the tunnel interface associated with the addressing information and use the identified tunnel interface to forward the encapsulated packet.

In examples where an entry does not exist in the cache, caching service 630 may direct processing system 650 to perform a hash or other similar operation to select a tunnel interface for an egress encapsulated packet. For example, caching service 630 may hash addressing information in a packet to select a tunnel interface for an egress packet. Once selected, the packet may be forwarded using the selected tunnel interface to a corresponding gateway. In some implementations, once hashed, the addressing information may be cached with an identifier for the tunnel interface, such that future packets with the same addressing information are forwarded using the same tunnel interface. Advantageously, future packets may not require hashing or processing prior to being forwarded to a destination gateway.

Although demonstrated in the previous example using caching in a gateway to associate addressing information with tunnel interfaces, similar operations may be performed at the host in a computing environment when the host is coupled to multiple edges. Specifically, the host may receive an encapsulated packet at a tunnel endpoint. Once received, the host may decapsulate the packet and identify addressing information in the packet. The addressing information may then be stored as an entry in a cache if an entry does not exist for the addressing information. The cache may associate the addressing information with a tunnel endpoint identifier for the tunnel endpoint that the encapsulated packet was received on. For example, the host may be coupled to two edge gateways and a tunnel endpoint on the host may be associated with each of the edge gateways. When return traffic includes addressing information associated with an entry in the cache, the traffic can be encapsulated and forwarded to using a corresponding tunnel endpoint to a destination gateway. In examples, where an entry is not present in the cache, an edge may be selected using hashing or some other mechanism. Once selected, the traffic may be encapsulated, and the traffic may be forwarded to the selected edge. Additionally, the host may update a cache that associates the addressing information with a corresponding edge or tunnel endpoint associated with the edge.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a first gateway, the method comprising:
   receiving, from a second gateway, an encapsulated first packet at a first tunnel interface of a plurality of tunnel interfaces;
   decapsulating the encapsulated first packet to obtain the first packet;
   identifying addressing information in the first packet and an identifier for the first tunnel interface at which the encapsulated first packet was received;
   in response to receiving the encapsulated first packet at the first tunnel interface, storing an entry in a cache that associates the addressing information from the first packet with the identifier for the first tunnel interface at which the encapsulated first packet was received;
   communicating the first packet to a computing system;
   receiving, from the computing system, a second packet;
   identifying the entry in the cache that corresponds to addressing information in the second packet;
   in response to identifying the entry that corresponds to the addressing information in the second packet, identifying that the entry includes the identifier for the first tunnel interface;
   in response to the entry including the identifier for the first tunnel interface, selecting the first tunnel interface from the plurality of tunnel interfaces to communicate the second packet;
   encapsulating the second packet; and
   communicating the encapsulated second packet to the second gateway using the first tunnel interface.

2. The method of claim 1, wherein the encapsulated first packet comprises an IPsec packet.

3. The method of claim 1, wherein the addressing information in the first packet comprises a source and destination IP address.

4. The method of claim 3, wherein the addressing information in the first packet further comprises source port, destination port, and protocol.

5. The method of claim 1 further comprising:
   receiving a third packet;
   determining that addressing information in the third packet does not correspond to an entry in the cache;
   in response to determining that the addressing information in the third packet does not correspond to an entry in the cache, hashing header information of the third packet to select a tunnel interface from the plurality of tunnel interfaces;
   encapsulating the third packet; and
   forwarding the encapsulated third packet using the selected tunnel interface.

6. The method of claim 1, wherein the computing system comprises a host computing system for one or more virtual machines, and wherein communicating the first packet to the computing system comprises:
   encapsulating the first packet to create a second encapsulated packet; and
   forwarding the second encapsulated packet to the host computing system.

7. The method of claim 6, wherein the second encapsulated packet comprises a Generic Network Virtualization Encapsulation (GENEVE) packet.

8. The method of claim 6, wherein receiving, from the computing system, the second packet comprises:
   receiving the second packet in a third encapsulated packet; and
   decapsulating the third encapsulated packet to identify the second packet.

9. A computing apparatus comprising:
   a storage system;
   a processing system operatively coupled to the storage system; and program instructions stored on the storage system to operate a first gateway that, when executed by the processing system, direct the computing apparatus to:
- receive, from a second gateway, an encapsulated first packet at a first tunnel interface of a plurality of tunnel interfaces;
- decapsulate the encapsulated first packet to obtain the first packet;
- identify addressing information in the first packet and an identifier for the first tunnel interface at which the encapsulated first packet was received;
- in response to receiving the encapsulated first packet at the first tunnel interface, store an entry in a cache that associates the addressing information from the first packet with the identifier for the first tunnel interface at which the encapsulated first packet was received;
- communicate the first packet to a computing system;
- receive, from the computing system, a second packet;
- identify the entry in the cache that corresponds to addressing information in the second packet;
- in response to identifying the entry that corresponds to the addressing information in the second packet, identifying that the entry includes the identifier for the first tunnel interface;
- in response to the entry including the identifier for the first tunnel interface, select the first tunnel interface from the plurality of tunnel interfaces to communicate the second packet;
- encapsulate the second packet; and
- communicate the encapsulated second packet to the second gateway using the first tunnel interface.

10. The computing apparatus of claim 9, wherein the encapsulated packet comprises an IPsec packet.

11. The computing apparatus of claim 9, wherein the addressing information in the first packet comprises a source and destination IP address.

12. The computing apparatus of claim 11, wherein the addressing information in the first packet further comprises source port, destination port, and protocol.

13. The computing apparatus of claim 9, wherein the program instructions further direct the computing apparatus to:
- receive a third packet;
- determine that addressing information in the third packet does not correspond to an entry in the cache;
- in response to determining that the addressing information in the third packet does not correspond to an entry in the cache, hash header information of the third packet to select a tunnel interface from the plurality of tunnel interfaces;
- encapsulate the third packet; and
- forward the encapsulated third packet using the selected tunnel interface.

14. The computing apparatus of claim 9, wherein the computing system comprises a host computing system for one or more virtual machines, and wherein communicating the first packet to the computing system comprises:
- encapsulating the first packet to create a second encapsulated packet; and
- forwarding the second encapsulated packet to the host computing system.

15. The computing apparatus of claim 14, wherein the second encapsulated packet comprises a Generic Network Virtualization Encapsulation (GENEVE) packet.

16. The computing apparatus of claim 14, wherein receiving, from the computing system, the second packet comprises:
- receiving the second packet in a third encapsulated packet; and
- decapsulating the third encapsulated packet to identify the second packet.

17. A system comprising:
a plurality of gateways;
a first gateway of the plurality of gateways configured to:
- receive, from a second gateway of the plurality of gateways, an encapsulated first packet at a first tunnel interface of a plurality of tunnel interfaces;
- decapsulate the encapsulated first packet to obtain the first packet;
- identify addressing information in the first packet and an identifier for the first tunnel interface at which the encapsulated first packet was received;
- in response to receiving the encapsulated first packet at the first tunnel interface, store an entry in a cache that associates the addressing information from the first packet with the identifier for the first tunnel interface at which the encapsulated first packet was received;
- communicate the first packet to a computing system;
- receive, from the computing system, a second packet;
- identify the entry in the cache that corresponds to addressing information in the second packet;
- in response to identifying the entry that corresponds to the addressing information in the second packet, identify that the entry includes the identifier for the first tunnel interface;
- in response to the entry including the identifier for the first tunnel interface, select the first tunnel interface from the plurality of tunnel interfaces to communicate the second packet;
- encapsulate the second packet; and
- communicate the encapsulated second packet to the second gateway using the first tunnel interface.

18. The system of claim 17, wherein the encapsulated packet comprises an IPsec packet.

19. The system of claim 17, wherein the addressing information in the first packet comprises a source and destination IP address.

20. The system of claim 17, wherein the first gateway is further configured to:
- receive a third packet from the computing system;
- determine that addressing information in the third packet does not correspond to an entry in the cache;
- in response to determining that the addressing information in the third packet does not correspond to an entry in the cache, hash header information of the third packet to select a tunnel interface from the plurality of tunnel interfaces;
- encapsulate the third packet; and
- forward the encapsulated third packet using the selected tunnel interface.

* * * * *